Figure 1:
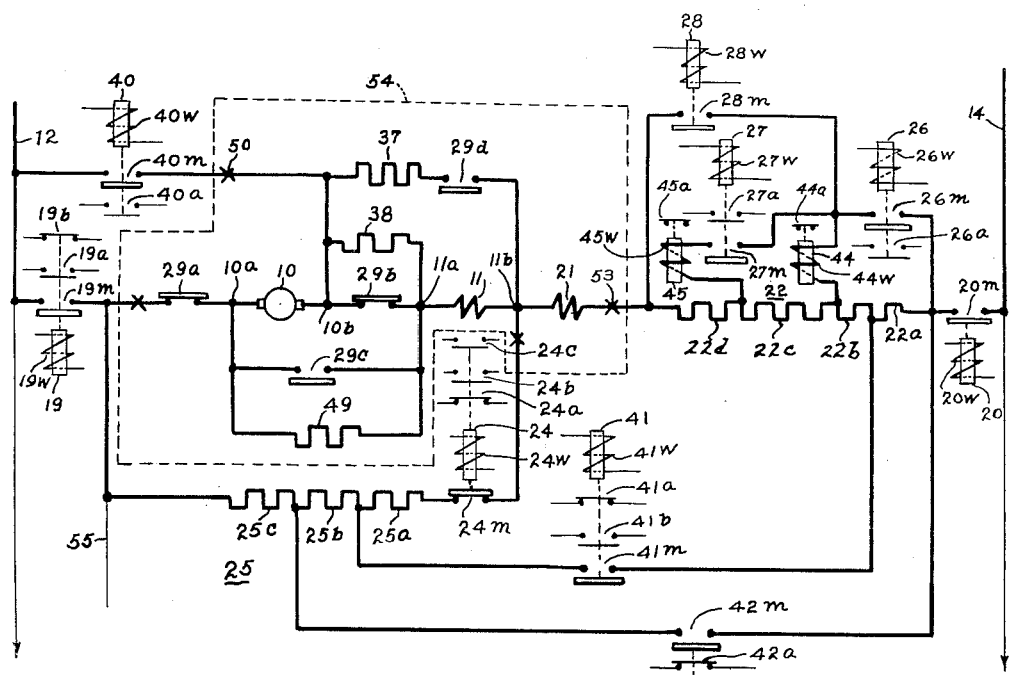

July 18, 1950  H. L. RATHBUN  2,515,612
MOTOR CONTROL SYSTEM
Filed Feb. 20, 1946  2 Sheets-Sheet 1

INVENTOR.
Harold J. Rathbun,
BY
John H. Leonard &
Harold J. Rathbun,
his attorneys.

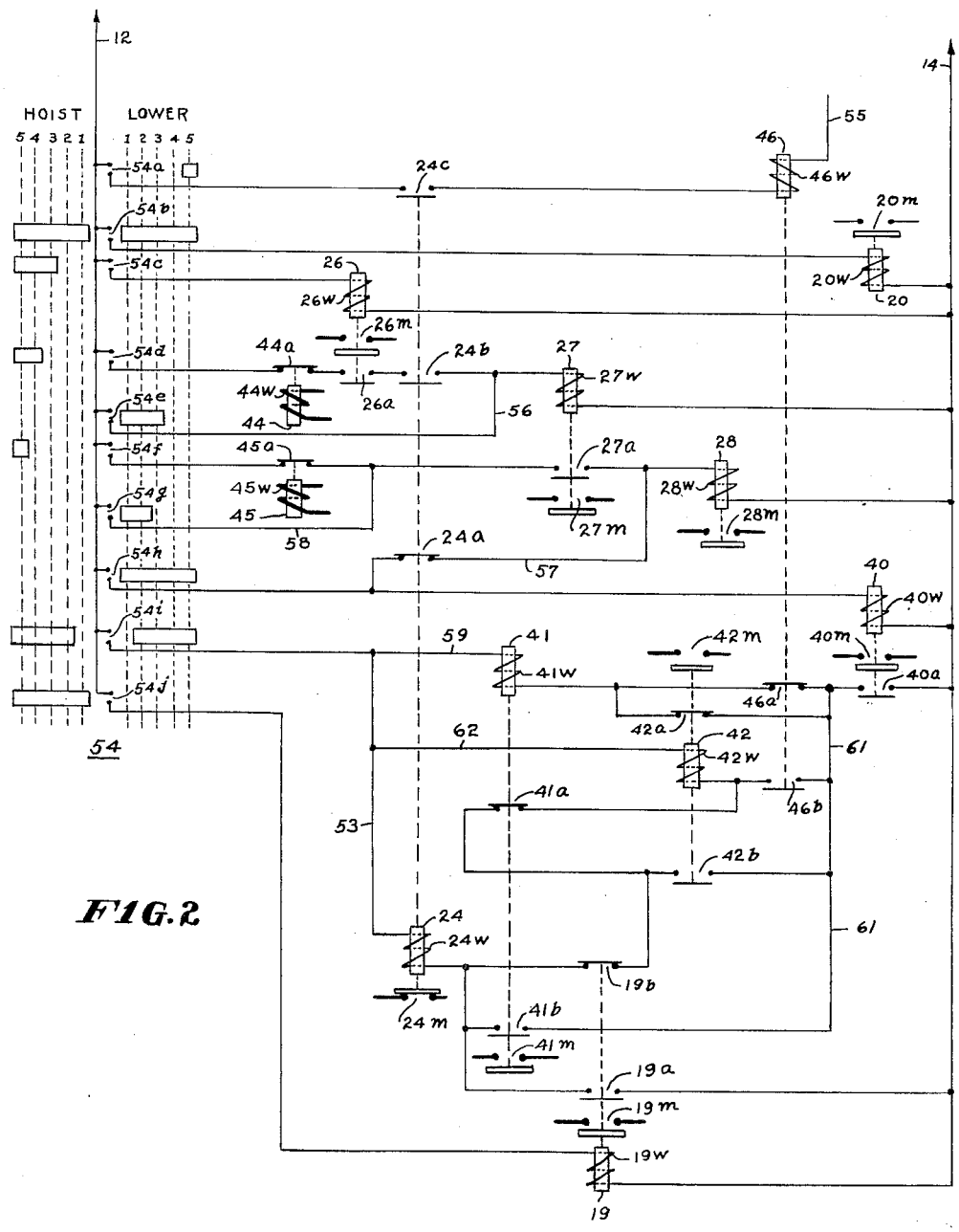

Patented July 18, 1950

2,515,612

UNITED STATES PATENT OFFICE 2,515,612

MOTOR CONTROL SYSTEM

Harold J. Rathbun, Cleveland, Ohio, assignor to The Electric Controller & Manufacturing Company, Cleveland, Ohio, a corporation of Ohio Application February 20, 1946, Serial No. 648,951

9 Claims. (Cl. 318—262)

This invention relates to a motor control system and more particularly to a control system for a direct current motor driving the hoist motion of a crane or the like wherein the armature winding and field winding of the motor are connected in series with each other for hoisting and in parallel with each other for normal lowering operations, and wherein a limit switch or limit stop is used for automatically completing an emergency dynamic braking circuit for the motor in event the motor raises the load too high.

In the operation of a hoist by a direct current motor, it is common practice to control the normal lowering operations, which occur with the limit switch in its normal untripped position, by setting up a dynamic lowering circuit which permits the motor either to drive the load as a shunt motor or to retard the load as a generator, the weight of the load alone determining the action of the motor. Suitable resistors in series with the motor and also in the field and armature circuits are regulated to control the speed during the normal lowering operations. The motor is generally connected as a series motor for hoisting purposes because of the good speed-torque characteristics of such a connection, and some of the same resistors used during lowering are connected in series with the motor and are regulated to control the hoisting speed. In many instances a very slow hoisting speed is obtained by connecting a resistor, also used during lowering, in parallel with the motor to provide a motor shunt connection.

It is also common practice in such prior hoist control systems to utilize the limit switch as a control means to establish an emergency dynamic braking circuit for the motor in response to movement of the hoist beyond a predetermined point in the hoisting direction. Operation of the limit switch also disconnects the motor from the power source and, except when the motor shunt connection for slow speed hoisting is completed, permits the usual spring-applied, electromagnetically-released, friction brake to be applied. In the event of over-travel in the hoisting direction, therefore, the motor is slowed down by dynamic braking or, if the shunted motor hoisting connections are not completed, is brought to rest under the combined influence of dynamic and friction braking. In such prior systems, after the limit switch has tripped or operated to stop the motor, a series motor lowering circuit may be established by moving a master switch to any of its lowering positions to release the friction brake and enable the load to be driven downwardly out of the limit zone by the motor while the motor is connected as a series machine. Even though the master switch is in the slowest series motor lowering position, a speed limiting means such as an armature shunt connection has been found necessary on modern hoists equipped with anti-friction bearings to prevent excessive lowering speeds from being reached before the limit switch resets, especially if a heavy overhauling load is being carried by the hoist. As soon as the limit switch resets, the conventional, relatively slow-speed dynamic braking lowering circuit is established causing the motor to slow down suddenly if the series motor speed is not limited. As a result of such a sudden deceleration, the entire hoisting mechanism is subjected to severe mechanical strains and the motor is apt to have commutation difficulties. The change of speed is especially great if the master switch is in the first or slowest lowering position which, if a heavy load is being lowered, is the preferred position, but even if the master switch is in the last or fastest lowering position, the speed change upon resetting of the limit switch is also very large.

The light hook hoisting speeds of modern anti-friction bearing cranes are also much greater than the corresponding speeds of older cranes equipped with sleeve bearings. At the present time, light hook hoisting speeds of the order of 275 per cent of rated full load speed are quite common, and some cranes are being operated at speeds as high as 325 per cent of rated full load speed. Since, due to limited hook travel distance, the excessive hoisting speeds are generally reached only when the empty hook is approaching the limit switch, and since the duty cycle of many cranes does not require extremely high light hook hoisting speeds, the excessive hoisting speeds add little to the all-day efficiency of a hoist. However, the increased light hook hoisting speeds of modern anti-friction hoists heretofore have made it necessary, in order to protect the motor from excessive braking currents and voltages, to increase the ohmic value of the dynamic braking resistor in the dynamic braking circuit which is completed by operation of the limit switch when the hook reaches the overhoist limit. Although increasing the dynamic braking resistance reduces the current and voltage peaks which occur upon the hook entering the limit switch zone at these higher speeds, thereby protecting the motor, the increase in resistance has serious disadvantages. For example, the increased resistance reduces the amount of braking torque produced at all entering speeds thereby greatly increasing the wear on the friction brake and, unless the limit switch is adjusted to operate at relatively low hook elevations, makes it possible for the hook to strike the drum due to the failure of the brake to set when the motor shunt connection for slow speed hoisting is completed nearly concurrently with the tripping of the limit switch. Normally the motor shunt connection does not present a great hazard since, if the hoist is operating at a slow speed, the reduced dynamic braking torque and the friction of the hoist drive itself are adequate to stop the hook. However, a dangerous condition arises when an empty hook is being raised at these excessive speeds and approximately at the instant that the limit switch operates the master switch is returned to a position causing completion of the motor shunt circuit. The completed motor shunt circuit prevents the setting of the friction brake, and the dynamic braking and the friction of the hoist drive alone are inadequate to stop the rapidly travelling hook before it strikes the drum.

Another of the disadvantages resides in the fact that since the resistor in the overhoist dynamic braking circuit is connected in parallel with the series connected armature and field windings when the lowering connections are established by the master switch, the increased ohmic value of this resistor causes a correspondingly increased amount of current to flow through the motor resulting in an increased lowering out speed. Consequently, the foregoing disadvantages of the sudden reduction in lowering speed when the limit switch resets are aggravated.

Later prior control systems including means for completing an armature shunt connection for the motor while it is lowering a load from the limit switch zone have successfully prevented excessive lowering speeds from being reached. However, all of these later prior systems have required, as additional equipment, an armature shunt resistor along with an extra contact on the limit switch, an extra contactor, or an extra trolley bar and contactor.

In accordance with this invention, there is provided a control system which includes means for completing an armature shunt connection during series motor lowering and which possesses all of the advantages of these later prior systems but which does not require the use of such additional equipment except the armature shunt resistor. In addition, a means provided herein for reducing the excessive light load hoisting speeds, thereby permitting the use of an overhoist dynamic braking resistor having a reduced ohmic value, is co-related in accordance with the present invention to the armature shunt connection provided during series motor lowering so as to increase both the effectiveness of the latter and the overhoist dynamic braking action.

It is the general object of this invention to provide a dynamic lowering hoist control system which retains all of the advantages of the usual dynamic lowering hoist control system provided with a dynamic braking type overhoist limit switch and which includes improved means for eliminating any sudden changes in speed which would subject the hoist mechanism and motor to severe shocks and strains.

More specifically, a principal object is to provide an improved circuit for temporarily connecting a direct current hoist motor as a slow speed machine for lowering operations after a limit switch has been tripped to set up a dynamic braking circuit, and for maintaining said connection effective only until the limit switch resets due to said lowering action.

It is a further object to provide a slow speed series motor lowering connection for lowering a hoist out of an overhoist limit switch zone without requiring the use of an additional electromagnetic switch or relay, or an additional contact on the limit switch.

A more specific object is to provide a slow speed series motor connection in a dynamic braking hoist controller by causing an armature shunt circuit to become effective to limit the lowering speed to a safe value, while lowering out of the limit switch zone, as the result of the opening of one of the usual normally closed contacts of an overhoist limit switch.

Many cranes include a trolley structure on which the hoist motor, electromagnetic brake, limit switch and certain other parts of the hoisting mechanism are mounted. The electromagnetic switch control panel or manual controller is usually mounted on the crane bridge instead of on the trolley structure which moves along the bridge. This arrangement of the hoist apparatus requires connections from the panel or controller to the apparatus on the trolley structure by means of trolley bars and collector shoes. Heretofore, most of such control systems have required four electrically independent trolley bars. Trolley bars are expensive to install, take up valuable space, and are a potential source of trouble. Accordingly, a further object of this invention is to provide, without increasing the number of trolley bars, an improved hoist control system having the foregoing advantages.

In a copending patent application of Asa H. Myles filed on even date, Serial No. 648,952, now abandoned, a dynamic lowering hoist control system including means to reduce the excessive light load hoisting speeds is described and claimed. The use of a means for reducing the excessive light load hoisting speeds permits the use of a lower resistance value in the dynamic braking loop set up by operation of the overhoist limit switch, and thus eliminates the aforementioned disadvantages resulting from the excessive hoisting speeds of modern cranes. It is a still further object of this invention to correlate such a light load speed reducing means with the means for limiting the series motor lowering speed of a dynamic lowering hoist controller so as to improve both the series motor lowering operations of the hoist and dynamic braking.

Figure 3:
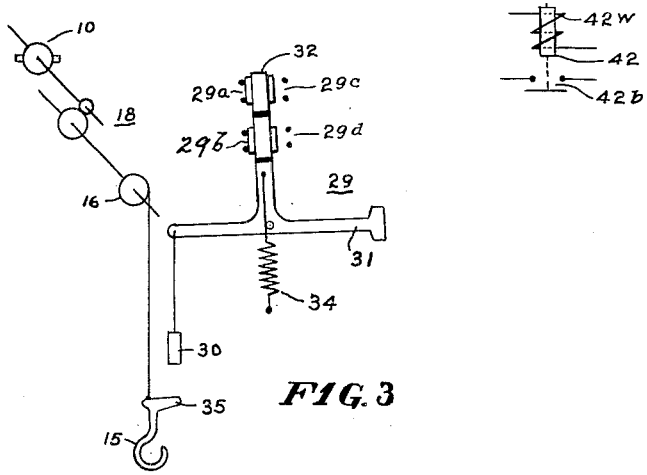

Other objects and advantages will become apparent from the following specification wherein reference is made to the drawings, in which:

Fig. 1 is a simplified wiring diagram of the power circuits and the contacts therein, and Fig. 2 is a simplified wiring diagram of the control circuits including a master switch and electromagnetic operating means for some of the contacts shown in Fig. 1, and Fig. 3 is a simple diagrammatic sketch of a crane hoist drive and limit switch operated thereby.

The invention is described herein as embodied in a preferred form of dynamic lowering hoist control system, but it is understood that the invention may be used with other suitable forms of dynamic lowering hoist control systems as well.

Referring principally to Fig. 1, a direct current motor comprising an armature winding 10 having brush terminals 10a and 10b and a series-type field winding 11 having terminals 11a and 11b is arranged to be energized from direct current power supply conductors 12 and 14 for raising and lowering of a load holding device such as a hook 15 (Fig. 3) suspended from a cable drum 16 driven by the motor through suitable gearing 18. For operation of the motor in the hoisting direction, electromagnetic switches 19 and 20 are arranged to connect, through their respective main contacts 19m and 20m, the armature winding 10, the field winding 11, an operating winding 21 of a spring-applied, electromagnetically-released brake (not shown), and an acceleration and speed controlling resistor 22 in series with each other across the supply conductors 12 and 14. The brake is operable in a well-known manner to hold the drum 16 against rotation whenever the winding 21 is deenergized and to permit rotation of the drum whenever the winding 21 is energized. For slow speed hoisting of the hook 15, normally spring-closed main contacts 24m of an electromagnetic switch 24 complete a shunt circuit for the motor through a resistor 25 having sections 25a, 25b, and 25c. Increased hoisting speeds are obtained by opening the contacts 24m of the switch 24 and by seriately closing main contacts 26m, 27m, and 28m of electromagnetic acceleration switches 26, 27, and 28, respectively, to short circuit sequentially sections 22a and 22b, 22c, and 22d of the resistor 22 from the motor circuit.

To protect against raising the hook 15 too closely to the drum 16, a limit switch 29 is provided which may be any one of a number of well-known dynamic braking types provided with a pair of normally closed contacts and a pair of normally open contacts. As shown diagrammatically in Fig. 3, the limit switch 29 comprises a weight 30 suitably suspended from a counterbalanced lever arm 31 which is arranged to actuate an insulated contact arm 32 through a suitable snap action device shown as a coil spring 34. Attached to the contact arm 32 are the bridging portions of a pair of normally closed contacts 29a and 29b and a pair of normally open contacts 29c and 29d which pairs of contacts are also shown diagrammatically in Fig. 1. A projecting portion 35 of the hook 15 is arranged to engage the weight 30 when the motor lifts the hook 15 beyond a predetermined point. Engagement of the hook portion 35 with the weight 30 releases the lever arm 31 and permits the spring 34 to move the contact arm 32 from the normal left-hand position shown to a right-hand position. This movement of the contact arm 32 causes opening of the contacts 29a and 29b and closing of the contacts 29c and 29d with a snap action.

Referring again to Fig. 1, opening of the contacts 29a of the limit switch 29 disconnects the armature terminal 10a from the supply conductor 12, and opening of the contacts 29b interrupts the usual connection between the armature terminal 10b and the field terminal 11a. Closure of the contacts 29c and 29d completes a dynamic braking circuit for the motor from the armature terminal 10a through the contacts 29c to the field terminal 11a where, in accordance with the present invention, the circuit divides. One branch of the divided circuit is the usual braking circuit and is through the field winding 11 from the terminal 11a to the terminal 11b, the contacts 29d, and a resistor 37 to the armature terminal 10b. For purposes later to be described a resistor 38 is connected in parallel with the contacts 29b between the terminals 10b and 11a and constitutes the other branch of the divided circuit. During lowering operations of the hoist, with the limit switch 29 in its normal, untripped position, the armature winding 10 and the field winding 11 are connected so that the motor becomes in effect a shunt machine. For these normal operations of the motor in the lowering direction, main contacts 40m of an electromagnetic switch 40 complete a connection from the supply conductor 12 to the armature terminal 10b and through the contacts 29b to the field terminal 11a. An armature circuit including the armature winding 10 extends to the power conductor 14 from the armature terminal 10a through all or a portion of the resistor 25, and a field circuit including the field winding 11 extends to the supply conductor 14 from the field terminal 11b through the brake winding 21 and all or a portion of the resistor 22, the switch 20 serving to complete the connection from the right-hand terminal of the resistor 22 to the conductor 14. Speed control during lowering is effected by selective operation of the switches 24, 27, and 28 and also by selective operation of electromagnetic switches 41 and 42 having main contacts 41m and 42m, respectively.

Acceleration relays may be used to delay the closure of the switches 27 and 28 during hoisting operations, and, as shown, relays 44 and 45 having normally closed contacts 44a and 45a, respectively, are provided for this purpose. Although any suitable type of acceleration relay may be used, relays 44 and 45 are preferably of the type described and claimed in Trofimov Patent No. 1,980,736, issued November 13, 1934. A counter-voltage acceleration relay 46 (Fig. 2) having normally closed contacts 46a and normally open contacts 46b is provided for delaying the closure of the switch 42 during lowering operations. As set forth in said copending application, a resistor 49 is preferably connected across the normally open contacts 29c of the limit switch 29 for limiting the light load hoisting speed in a manner to be described. In accordance with the present invention, as explained more fully hereinafter, advantage is taken of the inclusion of the resistor 49 by correlating it and the resistor 38 provided herein so as to permit the use of a lower ohmic value for the resistor 38. Such correlation resides in selecting the value of the resistor 49 so that the light hook hoisting speed is adequately reduced and permits the ohmic value of the resistor 37 to be reduced adequately to permit the use of a lower ohmic value for the resistor 38 without adverse effect on the dynamic braking torque. If desired, the resistors 37, 38, and 49 may be built as a single unit with the necessary intermediate taps.

The motor, the brake winding 21, the limit switch 29, and the resistors 37, 38, and 49 may be disposed inside of a plurality of trolley wheels and cooperating trolley bars indicated by the reference characters 50, 51, 52 and 53. Thus the motor, the brake, the limit switch and the resistors 37, 38, and 49 may be mounted on a portion of a crane structure such as a trolley 54 which moves relatively to the remainder of the crane structure upon which the other elements of the control system of Figs. 1 and 2 may be mounted.

In order to lower the hook 15 while the limit switch is in its tripped position, the contacts 20m and 40m are closed and a motor circuit is completed from the supply conductor 12 through the contacts 40m, the armature winding 10 from the terminal 10b to the terminal 10a, the limit switch contacts 29c, the field winding 11 from the terminal 11a to 11b, the brake winding 21, all or a part of the resistor 22, and the contacts 20m to the supply conductor 14. The motor is now connected as a series machine and exerts a torque in the lowering direction. A shunt circuit around the motor from the armature terminal 10b to the field terminal 11b through the limit switch contacts 29d and the resistor 37 also exists during series motor lowering and reduces the motor torque depending upon the value of the resistor 37. However, if the crane is provided with antifriction bearings and the load on the hook 15 is relatively large, the speed of the motor may reach excessive values before the limit switch resets even though the resistor 37 has the relatively low value made possible by the use of the resistor 49. The resistor 38, in accordance with this invention, being connected between the terminals 10b and 11a, provides a shunted armature connection which limits the lowering speed to a safe value during lowering operations with the limit switch 29 tripped. It is to be noted that so long as the limit switch is in its tripped position wth the contacts 29b open and the contacts 29c closed, the resistor 38, being permanently connected to the terminals 10b and 11a, is operatively connected in parallel with the armature winding 10 between the terminals 10a and 10b. When the limit switch contacts 29b are closed, the resistor 38 is short circuited and thereby rendered completely ineffective so as not to alter normal operations of the hoist.

During dynamic braking occasioned by tripping of the limit switch 29, the resistor 38 is operatively connected in parallel with the armature winding 10 as above described as well as in parallel with the series connected field winding 11 and the resistor 37. The resistor 38 thus shunts some of the dynamic braking current from the field winding 11 and thereby decreases the dynamic braking torque for given values of armature current. Because of magnetic saturation of the field poles, however, it has been found that even when the ohmic value of the resistor 37 is at the usual high enough value required to limit sufficiently the dynamic braking currents when the resistor 49 is not used, the resistor 38 may have an ohmic value small enough to serve effectively as an armature shunt resistor in lowering out of the limit stop and still not decrease excessively the dynamic braking torque. When the resistor 49 is used, its ohmic value may be properly correlated with the values of the resistors 37 and 38 so that the value of the resistor 37 is reduced and in turn, because of the resultant lower resistance of the field branch of the dynamic braking circuit, permits the use of a resistor 38 having a lower ohmic value. A reduced value of the resistor 38, in turn, permits extremely slow series motor lowering speeds. By this correlation of the resistors 37, 38 and 49, the advantages above described are obtained in addition to those improved dynamic braking advantages resulting from the inclusion of the resistor 49 alone as described in said copending application.

As one example, when the limit switch 29 is in its normal position and the resistor 49 thereby rendered operative to complete an armature shunt connection, the resistor 49 can be correlated properly with the resistors 37 and 38 so as to obtain all of these advantages if its ohmic value is such that the maximum empty hook hoisting speed is caused to be between 200% and 250% of full load speed. As set forth in the above copending application, it has been discovered that a resistor 49 of this value, even though operatively connected in parallel with the armature winding 10 during all normal hoisting and lowering operations neither materially alters the speeds obtained when all but extremely light loads are being hoisted at maximum possible speeds nor greatly reduces the intermediate hoisting and all lowering speeds of all loads. The resultant lower light load hoisting speed permits the ohmic value of the dynamic braking resistor 37 to be reduced without causing the sparking at the motor commutator which would occur if the limit switch were tripped while the motor was operating at the maximum possible hoisting speed obtainable without the use of the resistor 49. Reduction in the value of the resistor 37 increases the effectiveness of the dynamic braking circuit for all hoisting speeds and permits the value of the resistor 38 to be lower than is required when the resistor 49 is not used.

Each of the switches and relays has an operating winding identified by the reference character of the particular switch or relay followed by the subscript w, and, with the exception of the windings 44w and 45w, the switch or relay operating windings are under the control of a multi-position, reversing master switch 54 (Fig. 2) having a plurality of contacts 54a to 54j, inclusive. Several of the switches are provided with control circuit contacts which are identified by the reference character of the particular switch followed by a letter subscript such as a, b, or c. All of the master switch contacts are open when the master switch 54 is in the off position illustrated, and are arranged to be closed selectively in the operated positions of the master switch as indicated by the developed showing of the master switch segments. Each of the master switch contacts 54b to 54j when closed completes a circuit from the power supply conductor 12 through one or more switch operating windings to the supply conductor 14. The contacts 54a when closed complete a circuit for the operating winding 46w from the supply conductor 12 through a conductor 55 to the motor circuit (Fig. 1) between the contacts 19m and 29a. The master switch 54 is preferably mounted on the same part of the crane structure as the electromagnetic switches and relays and the resistors 22 and 25.

With the foregoing understanding of the control system elements and their electrical interconnection the operation of the system will become apparent from the following description thereof:

Assuming that the motor is at standstill and the operating winding 21 of the brake is deenergized so that the brake holds the drum 16 against rotation, and further assuming that the remainder of the apparatus is in the normal deenergized positions indicated by the drawing, an emergency dynamic braking circuit is completed (Fig. 1) from the armature terminal 10a through the contacts 29a, the resistor 25, the contacts 24m, the field winding 11 from the terminal 11b to the terminal 11a, and the contacts 29b to the armature terminal 10b.

To hoist the hook 15 at slow speeds, the master switch 54 is moved to its first hoisting position wherein the contacts 54b are closed and complete a circuit from the supply conductor 12 through the winding 20w to the supply conductor 14, and wherein the contacts 54j are closed and complete a circuit from the conductor 12 through the winding 19w to the conductor 14. Energization of the windings 19w and 20w causes closure of the contacts 19m and 20m to complete a circuit (Fig. 1) extending from the conductor 12 through the contacts 19m, the contacts 29a, the armature winding 10, the contacts 29b, the field winding 11, the brake winding 21, the resistor 22 and the contacts 20m to the conductor 14. The circuit through the resistor 25 and the contacts 24m remains completed while the master switch is in the first hoisting position to provide a slow-speed, motor shunt connection, and the current flowing through the brake winding 21 releases the brake.

Increased hoisting speeds are obtained upon movement of the master switch 54 to the second hoisting position wherein the contacts 54i are closed and complete a circuit from the conductor 12 to the conductor 14 through a conductor 53, the winding 24w, and the contacts 19a which closed upon energization of the winding 19w. Energization of the winding 24w causes opening of the contacts 24m which interrupts the motor shunt circuit through the resistor 25 thereby causing an increase in the motor speed. Closure of the contacts 24c and opening of the contacts 24a resulting from the energization of the winding 24w have no effect at this time, but closure of the contacts 24b partially completes a circuit from the conductor 12 to the winding 27w. In event that the switch 24 fails to operate for any reason upon energization of the winding 24w, the consequent failure of the contacts 24b to close renders subsequent energization of the winding 27w impossible thereby to prevent acceleration of the motor to its normal speed.

A further increase in hoisting speed is obtained by moving the master switch to the third hoisting position wherein the contacts 54c are closed and complete an obvious energizing circuit for the winding 26w. Energization of the winding 26w causes closure of the contacts 26a in the circuit of the winding 27w and causes closure of the contacts 26m which when closed short circuit the resistor sections 22a and 22b. The current flowing around the resistor sections 22a and 22b through the contacts 26m energizes the winding 44w and causes opening of the contacts 44a in the energizing circuit of the winding 27w for a time interval dependent upon the magnitude of the current flowing through the winding 44w during the interval as described in the above mentioned Trofimov patent.

When the master switch is in the fourth hoisting position, the contacts 54d are closed and complete a circuit from the conductor 12 through the winding 27w to the conductor 14 provided that the contacts 44a, 26a and 24b interposed in the circuit are all closed. Energization of the winding 27w causes closure of the contacts 27m to short circuit the resistor section 22c and also causes closure of the contacts 27a in an energizing circuit for the winding 28w. Upon closure of the contacts 27m the motor current flowing therethrough causes energization of the winding 45w of the relay 45 which thereupon opens the contacts 45a in the energizing circuit for the winding 28w for a time interval as in the case of the relay 44.

If the master switch is now moved to the fifth hoisting position, the contacts 54f close and complete the energizing circuit for the winding 28w depending upon the prior closure of the contacts 45a and 27a. Closure of the contacts 28m upon energization of the winding 28w short circuits the remainder of the resistor 22 so that the hoist motor is now connected directly across the power supply conductors 12 and 14.

The operation of the resistor 49 at all times during hoisting while the limit switch 29 is in its normal untripped position is as follows:

The resistor 49 is operatively connected in parallel with the armature winding 10, thereby causing the current in the field winding 11 to be slightly higher than it would be if the resistor 49 were not so connected. The resistor 49 preferably has an ohmic value such that so long as the motor is hoisting a considerable load or so long as some of the acceleration resistor 22 is in the motor circuit, the speed of the motor is not greatly decreased by the presence of the resistor 49. If the motor is subjected to a very light load such as merely lifting the hook 15 when empty, however, and the resistor 22 is all short circuited, the motor speed with the resistor 49 connected is much less than it would be if the resistor 49 were not connected in the motor circuit. Exemplary ohmic values for the resistor 49 in order to accomplish the desired result of limiting the maximum light load hoisting speed to a desirable speed for dynamic braking action without materially reducing other hoisting speeds are between six and ten times the quotient obtained by dividing the rated voltage of the motor by the full load current of the motor in amperes. A resistor so selected can be properly correlated with the resistors 37 and 38. When the resistor 49 is used, the ohmic value of the resistor 37 in the dynamic braking circuit may be as low as 50% of the quotient obtained by dividing the rated motor voltage by the full load motor current in amperes since, if an empty hook is hoisted into the limit switch zone with all of the resistor 22 out of the motor circuit, the resistor 49 limits the speed to a low enough value to permit proper and safe commutation of the braking current. If the resistor 49 is not used, the resistance of the resistor 37 would have to be in the neighborhood of 100% of the voltage-armature current quotient for proper commutation.

If the hook 15 is hoisted high enough so that the limit switch is tripped, the contacts 29a and 29b open to disconnect the motor from the power conductor 12 and the contacts 29c and 29d close to complete the previously traced emergency dynamic braking circuit. Closure of the contacts 29c short circuits the resistor 49 and renders it completely inoperative during the braking period as well as while the hook is being lowered out of the limit switch zone.

Power lowering or dynamic braking lowering of the hook 15 with the limit switch 29 in its normal position is accomplished by moving the master switch 54 to any one of the lowering positions. Upon movement of the master switch to the first lowering position, the windings 20w, 27w, 28w, and 40w of the switches 20, 27, 28 and 40, respectively, are energized concurrently. The energizing circuit for the winding 20w is completed from the supply conductor 12 through the contacts 54b, and the energizing circuit for the winding 27w is completed through the contacts 54e and a conductor 56. The energizing circuit for the winding 40w is completed through the contacts 54h, and the circuit to the winding 28w is initially completed through the contacts 54h and the normally closed interlock contacts 24a interposed in a conductor 57 thereby insuring operation of the switch 28 concurrently with operation of the switches 20, 27, and 40. After operation of the switch 27, due to energization of its winding 27w, a circuit through the contacts 54g, a conductor 58, and the interlock contacts 27a is completed and becomes operative upon subsequent opening of the contacts 24a to continue the energization of the winding 28w. Energization of the windings 20w, 27w, 28w, and 40w results in closure of the contacts 20m, 27m, 28m, and 40m to connect the motor in a slow-speed dynamic lowering circuit. With the lowering contacts 40m closed, a circuit is completed from the supply conductor 12 through the contacts 40m to the armature terminal 10b where the circuit divides into parallel connected armature and field circuits. The armature circuit with the master switch in the first lowering position is from the armature terminal 10b through the armature winding 10 to the armature terminal 10a, and thence through the contacts 29a, all of the resistor 25, and the contacts 24m to the field terminal 11b, and the corresponding field circuit extends from the armature terminal 10b through the contacts 29b and the field winding 11 from the field terminal 11a to the field terminal 11b. From the field terminal 11b the first point lowering motor circuit is completed through the brake winding 21, the contacts 28m, the coil 44w (the relay 44 is ineffective during lowering, however), the resistor sections 22b and 22a, and the contacts 20m to the supply conductor 14. With the foregoing motor circuit completed, a very slow lowering speed is obtained for all loads.

An increased lowering speed for light as well as heavy loads is obtained upon movement of the master switch 54 to the second lowering position. Upon closure of the master switch contacts 54i in the second lowering position, an energizing circuit for the winding 41w is completed through a conductor 59, the winding 41w, the contacts 42a and 46a in parallel with each other, and the contacts 40a which closed upon energization of the winding 40w. The contacts 41b close upon energization of the winding 41w to complete a circuit through the contacts 54i, the conductor 53, the winding 24w, the contacts 41b, and a conductor 61 to the contacts 40a. This sequential energization of the windings 41w and 24w results in closure of the contacts 41m followed by opening of the contacts 24m. The armature circuit now extends through sections 25c and 25b of the resistor 25 and the contacts 41m to a junction point 22' on the resistor 22 between the sections 22a and 22b, and the field circuit now extends through the brake winding 21, the contacts 28m, the winding 44w, and the resistor section 22b to the junction point 22' from whence the motor circuit is completed to the supply conductor 14 through the resistor section 22a and the contacts 20m. Energization of the winding 24w also results in closure of the contacts 24c in the energizing circuit for the winding 46w, in closure of the contacts 24b which serve no function during lowering, and opening of the contacts 24a to interrupt the circuit to the winding 28w through the conductor 57.

A further increase in the lowering speed is obtained upon movement of the master switch 54 to the third lowering position wherein the contacts 54g are open resulting in deenergization of the winding 28w since the contacts 24a opened upon operation of the switch 24. Opening of the contacts 28m consequent upon deenergization of the winding 28w inserts the resistor section 22d into the field circuit which now extends from the armature terminal 10b through the contacts 29b, the field winding 11, the brake winding 21, the resistor 22d, the winding 45w (the relay 45 is ineffective in lowering, however), the contacts 27m, the winding 44w, and the resistor section 22b to the junction point 22'.

Movement of the master switch 54 to the fourth lowering position results in a further increase in lowering speeds due to the opening of the contacts 27m consequent upon deenergization of the winding 27w resulting from opening of the contacts 54e. The field circuit now includes the resistor sections 22b, 22c, and 22d. It should be noted that the armature circuit remains the same in the second, third, and fourth lowering positions.

Movement of the master switch 54 to the fifth lowering position causes closure of the contacts 54a to connect the winding 46w across the armature winding 10. The circuit for the winding 46w is from the armature terminal 10b, the contacts 40m, the supply conductor 12, the contacts 54a and 24a, the winding 46w, the conductor 55, and the contacts 29a to the armature terminal 10a. The contacts 24c are included in this circuit to prevent premature operation of the relay 46 if the master switch is moved rapidly to the fifth lowering position while the motor is operating in the hoisting direction. As soon as the counter-voltage of the armature reaches a predetermined value, the winding 46w is operatively energized to open the contacts 46a and to close the contacts 46b. Opening of the contacts 46a interrupts one circuit for the winding 41w, and closure of the contacts 46b completes an energizing circuit for the winding 42w from the contacts 54i through a conductor 62, the winding 42w, and the contacts 46b, to the contacts 40a. Energization of the winding 42w results in closure of the contacts 42m and 42b and opening of the contacts 42a. Opening of the contacts 42a opens the only remaining energizing circuit for the winding 41w and the switch 41 drops out to open the contacts 41m and 41b and to close the contacts 41a. Opening of the contacts 41b interrupts one circuit for the winding 24w, but the winding 24w remains energized through the contacts 19b and 42b. Sequential closing of the contacts 42m and opening of the contacts 41m consequent upon sequential energization of the winding 42w and deenergization of the winding 41w causes the field circuit now to include all of the resistor 22 and the armature circuit to include only the resistor section 25c with no resistance in series with both the armature and field circuits. The motor now operates at its fastest stable speed in the lowering direction.

The resistor 49 is connected across the armature winding 10 at all times during lowering so long as the limit switch 29 is in its normal position, but the relatively high resistance of the resistor 49 as described above prevents its connection in the circuit from having but little appreciable effect on the lowering speeds.

Movement of the master switch from the higher to the slower lowering speed positions or to the off position results in sequential operation of the switches opposite from that just described for lowering acceleration. In order to insure that the armature circuit is not opened during lowering deceleration, the winding 41w is energized through the contacts 46a upon drop-out of the relay 46 and the winding 42w remains energized after opening of the contacts 46b through a circuit including the contacts 41a and 42b. Although the windings 41w and 24w are deenergized concurrently in moving the master switch from the second to the first lowering position, the contacts 24m due to their spring bias close before the contacts 41m open.

If the hook 15 has been hoisted high enough to operate the limit switch 29 from its normal position, lowering is accomplished by moving the master switch into any of the lowering positions which results in the same sequence of switch operation as described for normal lowering operations and also effects connection of the motor as a series machine exerting a downward torque. With the limit switch 29 tripped, closure of the contacts 40m and 20m completes a motor circuit from the supply conductor 12 through the contacts 40m, the armature winding 10, the now closed contacts 29c, the field winding from the terminal 11a to 11b, the brake winding 21, part or all of the resistor 22 depending upon the master switch position, and the contacts 20m to the supply conductor 14. If the master switch is in the first or the second position, the contacts 28m and 27m are closed to shunt the resistor sections 22d and 22c.

As described for normal lowering operations, the switch 28 opens its contacts 28m when the master switch is moved to the third lowering position and the switch 27 opens its contacts 27m when the master switch is moved to its fourth lowering position. So long as the limit switch is tripped, operation of the switches 24, 41, and 42 has no effect since the contacts 29a are open. Opening of each of the contacts 28m and 27m results in an increase in resistance in series with the motor. The motor shunt circuit from the armature terminal 10b through the resistor 37 and the contacts 29d to the terminal 11b is completed when lowering with the limit switch tripped and the armature shunt circuit through the resistor 38 is operative at this time since the contacts 29b are open. The armature shunt circuit, including the resistor 38, causes the motor to exert dynamic braking torque if the load is overhauling so that the lowering speed does not become excessive before the limit switch resets. Since the resistor 38 is permanently connected, as shown, across the contacts 29b, it is rendered operative and inoperative directly by one of the usual limit switch contacts without the use of additional contactors or relays or special limit switch contacts. It has been found after exhaustive tests that the value of the resistor 38 may be made low enough to provide the desired slow speed lowering without materially reducing the dynamic braking torque upon the hook entering the limit switch zone even if the resistor 37 has the high value often required when light hook hoisting speeds can reach 300% of full load speed. The fact that the ohmic value of the resistor 37 may be reduced by provision of the resistor 49, however, permits greater freedom in selection of higher or lower values of the resistor 38 depending upon the relation between braking torque and series motor lowering speed desired in any particular case. For example, the resistor 38, for best speed limiting effects, has an ohmic value within the range of 30% to 50% of the quotient obtained by dividing the rated or operating voltages of the motor by the full load current of the motor in amperes.

I claim:

1. In a motor and control system combination for raising and lowering a load, a direct current motor adapted for connection to a source of power and having an armature winding and a field winding, which windings are adapted for shunt and series connection, selectively, with each other, for operation of the motor as a shunt and series machine, selectively, a limit switch mechanism having a normally closed contact means connected between a first terminal of said armature winding and a first terminal of said field winding and having a normally open contact means connected between a second terminal of said armature winding and said first terminal of said field winding, and being responsive to an elevated position of the load while the load is being raised to open said normally closed contact means and to close said normally open contact means, means for connecting a second terminal of said field winding to one side of said source of power, means for connecting said second terminal of said armature winding to the other side of said source of power for hoisting a load, and means for connecting said first terminal of the armature winding to said other side of said source of power for lowering a load when the second field terminal is connected to said one side of said source of power and while said normally closed contact means is open and said normally open contact means is closed, an acceleration resistor connected in series with said motor when said second armature terminal is connected to said source of power, the improvement which comprises a speed limiting resistor connected in parallel with said normally closed contact means and between said first armature terminal and said first field terminal to provide an armature shunt connection cooperating with said acceleration resistor to limit the lowering speed of the motor while said normally closed contact means is open and said normally open contact means is closed and until said normally closed contact means recloses.

2. In a control system for raising and lowering a load by a direct current motor adapted for connection to a source of power and having an armature winding and a field winding of the series type normally disconnected from the armature winding, the combination with an acceleration resistor, a limit switch mechanism including a first contact means adapted to complete, when closed, a first connection between a first terminal of the armature winding and a first terminal of the field winding, said limit switch including additional contact means adapted to complete, when closed, a second connection between a second terminal of the armature winding and said first field terminal, a hoisting switching means adapted to connect said second armature terminal to one side of said source of power and completing through said first connection a hoisting circuit for the motor with the motor connected as a series machine, said limit switch mechanism being operative consequent upon the load being raised to a predetermined elevated position to effect concurrently disconnection of the motor from said source, opening of said first contact means thereby to interrupt said first connection, and preparation of the motor for reverse operation as a series machine for lowering the load by completing said second connection, and lowering switching means adapted to connect said first armature terminal to said one side of said source of power and completing, when closed, a lowering circuit for the motor through said second connection and said acceleration resistor with said motor connected as a series machine, of a speed limiting resistor connected in parallel with said first contact means so as to be connected between said first armature terminal and said first field terminal and operative in cooperation with said acceleration resistor to limit the speed of the motor during lowering operation, said limit switch mechanism being operative consequent upon the load being lowered to a predetermined position to reclose said first contact means thereby to re-complete said first connection and to render said speed limiting resistor inoperative.

3. In an electric motor and control system combination for raising and lowering a load, a direct current motor adapted for connection to a source of power and having an armature winding and a field winding of the series type normally disconnected from the armature winding, an acceleration resistor, a limit switch mechanism including a first contact means completing, when closed, a first connection between a first terminal of the armature winding and a first terminal of the field winding, said limit switch including additional contact means completing, when closed, a second connection between a second terminal of the armature winding and said first field terminal, a hoisting switching means, when closed, connecting said second armature terminal to one side of said source and completing a hoisting circuit for the motor through said first connection with the motor connected as a series machine, said limit switch mechanism being operative consequent upon the load being raised to a predetermined elevated position to effect concurrently disconnection of said second armature terminal from said one side of said source, opening of said first contact means thereby to interrupt said first connection, and preparation of the motor for reverse operation as a series machine for lowering the load by completing said second connection, and lowering switching means, when closed, connecting said first armature terminal to said one side of said source and completing a lowering circuit for the motor through said second connection and said acceleration resistor with said motor connected as a series machine, of an armature shunt resistor connected in parallel with said first contact means and connected between said first armature terminal and said first field terminal and operative in cooperation with said acceleration resistor to limit the speed of the motor during lowering operation, said limit switch mechanism being operative consequent upon the load being lowered to a predetermined position to reclose said first contact means thereby to re-complete said first connection and to render said armature shunt resistor inoperative.

4. The combination according to claim 3 further characterized in that said armature shunt resistor has an ohmic value of from 30% to 50% of the quotient obtained by dividing the rated voltage of the motor by the full load current of the motor in amperes.

5. The combination with a motor control system for a hoist including a direct current motor having an armature winding and a field winding, which windings are adapted for shunt and series connection, selectively, with each other across a source of power, for operation of the motor as a shunt and series machine, selectively, to raise and lower various loads which, while being raised, subject the motor to a loading which may vary from near zero to rated full load, means for connecting said armature winding and said field winding in a series circuit with each other across the source of power for hoisting a load which may be so small as to permit said motor to operate at an excessive speed, a dynamic braking resistor, and limit means having a normally closed contact means interposed in said series circuit between a first armature terminal and a first field terminal and having a pair of normally open contact means, one of which is interposed in a circuit between a second armature terminal and said first field terminal and the other of which is interposed in a circuit between said first armature terminal and a second field terminal in series with said dynamic braking resistor, said limit means being operable at a predetermined elevated position of said load to open said normally closed contact means and to close said normally open contact means for reconnecting said armature winding and field winding to each other in a dynamic braking loop circuit with said dynamic braking resistor, said dynamic braking resistor having an ohmic value insufficient to limit the dynamic braking current, if said limit means operates while said motor is operating at said excessive speed, to a value below the commutation limit of said motor for such braking service, of means operative, when said small loads are being hoisted, for limiting the maximum hoisting speed of said motor to a value such that said dynamic braking resistor has a sufficient ohmic value to limit the dynamic braking current to a value below said commutation limit, a speed limiting resistor effectively connected, upon operation of the limit switch, in shunting relation to said armature winding between said first and second armature terminals, an acceleration resistor, and switching means operable, while said limit means is operated, for connecting said motor as a series machine across the source of power in series with said acceleration resistor for lowering a load at a speed limited by cooperation between said speed limiting resistor and said acceleration resistor.

6. An electric motor and control system combination in accordance with claim 1 characterized in that a dynamic braking resistor is provided, said limit switch mechanism having a second normally closed contact means interposed between said second armature terminal and said means for connecting said second armature terminals to the power source, said limit switch mechanism having a second normally open contact means connecting said second terminal of said field winding through said dynamic braking resistor to said first terminal of said armature winding, and said limit switch mechanism being operative to close and open said second normally closed contact means with said first normally closed contact means and to close and open said second normally open contact means with said first normally open contact means.

7. A control system in accordance with claim 2 characterized in that a dynamic braking resistor is provided, said limit switch includes further contact means adapted to complete, when closed, a circuit from a second field terminal of the motor to said first armature terminal through said dynamic braking resistor, and said limit switch mechanism is operative to close and open said further contact means with said additional contact means.

8. An electric motor and control system combination in accordance with claim 4 characterized in that a dynamic braking resistor is provided, said limit switch mechanism includes further contact means completing when closed a circuit from a second field terminal to said first armature terminal through said dynamic braking resistor, said limit switch mechanism is operative to close and open said further contact means with said additional contact means, and said dynamic braking resistor has an ohmic value in the neighborhood of 100% of said quotient.

9. The combination in accordance with claim 5 characterized in that the means operative for limiting the maximum hoisting speed of the motor is a resistor operatively connected between said second armature terminal and said first field terminal when said motor is connected for hoisting a load.

HAROLD J. RATHBUN.

REFERENCES CITED

The following references are of record in the file of this patent:

UNITED STATES PATENTS

| Number | Name | Date |
| --- | --- | --- |
| 1,099,512 | Palmer | June 9, 1914 |
| 1,113,337 | Hart | Oct. 13, 1914 |
| 1,113,593 | Wright | Oct. 13, 1914 |
| 2,245,253 | Cooke | June 10, 1941 |